United States Patent
Briesenick et al.

(10) Patent No.: US 6,595,741 B2
(45) Date of Patent: Jul. 22, 2003

(54) PRE-SWIRL NOZZLE CARRIER

(75) Inventors: Jan Briesenick, Berlin (DE); Winfried-Hagen Friedl, Berlin (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/946,337

(22) Filed: Sep. 6, 2001

(65) Prior Publication Data
US 2002/0028136 A1 Mar. 7, 2002

(30) Foreign Application Priority Data
Sep. 6, 2000 (DE) ......................... 100 43 906

(51) Int. Cl.[7] ............................... F01D 5/18
(52) U.S. Cl. .......................... 415/116; 415/185
(58) Field of Search ..................... 415/115, 116, 415/185, 191

(56) References Cited

U.S. PATENT DOCUMENTS 4,265,590 A * 5/1981 Davies ................. 415/110
4,291,531 A * 9/1981 Campbell .............. 60/39.51 R
4,807,433 A * 2/1989 Maclin et al. ........... 60/39.29

FOREIGN PATENT DOCUMENTS

| DE | 20 15 274 A | 10/1970 |
|---|---|---|
| GB | 1282142 | 7/1972 |
| GB | 20 81 392 A | 2/1982 |

* cited by examiner

*Primary Examiner*—Ninh H. Nguyen
(74) *Attorney, Agent, or Firm*—Davidson Berquist Klima & Jackson, LLP

(57) ABSTRACT

A pre-swirl nozzle carrier for an aircraft gas turbine with a body (1) is provided with a fitted seat (2) for the location of the pre-swirl nozzle carrier on a main carrier (3) and which features several pre-swirl nozzles (4), characterized in that the body (1) is extended radially inward, that it has several secondary pre-swirl nozzles (6) on its radial inward area (5) and that it is provided with an inner seal area (7) on its inner radial side.

20 Claims, 3 Drawing Sheets

PRE-SWIRL NOZZLE CARRIER

This application claims priority to German Patent Application No 10043906.3, filed Sep. 6, 2000, the contents of which are incorporated by reference herein.

BACKGROUND OF THE INVENTION

This invention relates to a pre-swirl nozzle carrier for an aircraft gas turbine with a body which is provided with a fitted seat for the location of the pre-swirl nozzle carrier on a main carrier and with several rows of pre-swirl nozzles.

In the prior art it is known that in aircraft gas turbines, compressor air is supplied into a disk pre-chamber for the cooling of the blades. The air is supplied via pre-swirl nozzles which enter the disk pre-chamber relatively far outside in the radial direction. The mouth of the pre-swirl nozzle lies near the air supply for blade cooling, enabling a large pressure difference to be used for the supply of cooling air. It is also known in the prior art to arrange the pre-swirl nozzles obliquely to achieve the best possible cooling effect.

It is further known in the prior art to seal the disk pre-chambers radially outwardly and, in particular, radially inwardly to preclude, in particular, the entrance of air or gas into the disk pre-chamber from the inside. This sealing is effected by a conventional labyrinth-type sealing arrangement.

In the designs known in the prior art, an inner seal carrier is arranged radially and thermally freely movable and de-coupled on a main carrier. Centering and support are effected by way of radial spokes. The thermal de-coupling achieved in this way serves the optimization of the seal, in particular the optimization of the thermal behavior.

The known design further provides that the pre-swirl nozzle carrier is located and centered on the main carrier by means of a fitted seat. The axial retention of the inner seal carrier is effected by means of an inner gap of the pre-swirl nozzle carrier.

The known designs result in a relatively irregular, stepped duct which entails an increase in both air volume and friction.

While effective cooling of turbine blading is ensured by the known designs, the air supply via the pre-swirl nozzles prevents the main area of the turbine-disk front wall from being cooled optimally. This suboptimal utilization of the cooling effect results in a relatively high temperature of the turbine disk. This entails, in turn, a decrease of the life of the turbine disk.

A further disadvantage lies in the manufacturing costs. The arrangement according to the prior art incurs a relatively high manufacturing effort, an effect which is generally undesirable.

Furthermore, both the mass and the assembly effort are raised.

In addition, the spokes of the inner labyrinth seal are liable to become inaccurately centered. The reason for this detriment is the clearance afflicted with the spokes. This may result in an increased leakage flow via the labyrinth seal which further increases the temperature in the disk pre-chamber.

BRIEF SUMMARY OF THE INVENTION

In a broad aspect, the present invention provides a pre-swirl nozzle carrier which combines simple design and simple, cost-effective manufacture and assembly with effective cooling of both the turbine blades and the turbine-disk front wall.

It is a particular object of the present invention, to provide a pre-swirl nozzle carrier for a gas turbine, comprising a body with a fitted seat positioned on the body, the fitted seat constructed and arranged to position the pre-swirl nozzle carrier on a main carrier of the gas turbine. A plurality of pre-swirl nozzles are positioned on the body communicating with a disk pre-chamber. The pre-swirl carrier further comprises a body portion extending radially inwardly from the fitted seat to a radially inward side with a plurality of secondary pre-swirl nozzles positioned on the radially inwardly extending body portion and communicating with the disk pre-chamber and a sealing portion positioned on the radially inward side of the body. Further objects and advantageous aspects of the invention will be apparent from the description below.

The pre-swirl nozzle carrier according to the present invention is characterized by a great variety of merits.

The radial inward extension of the body enables an inner seal area and additional secondary pre-swirl nozzles to be provided on its radial inner area. This results in a one-part design which generally is lighter than the two-part design according to the prior art. The one-part design also considerably decreases the assembly effort, in particular since the spokes for the support of the inner sealing area are dispensed with.

The arrangement according to the present invention also provides for optimum centering of the inner sealing area, thereby reducing the leakage flow in this area.

The additional, secondary pre-swirl nozzles according to the present invention provide for effective cooling and temperature decrease at the disk front wall. This increases the life of the disk without impairing the cooling of the turbine blades themselves.

In a particularly advantageous development of the present invention, the body comprises a wall extending axially rearward to a turbine-disk front wall to provide a narrow, smooth-walled disk pre-chamber. This arrangement enables the disk pre-chamber to be designed with a relatively small volume. Accordingly, the disk pre-chamber will contain only a relatively small quantity of air. This is particularly advantageous in terms of the physical processes. While the pre-swirl nozzle carrier is stationary during operation of the turbine, the turbine disk rotates at high speed. This condition generally leads to a temperature increase of the air in the disk pre-chamber. However, the smaller the air volume in the disk pre-chamber, the more favorable the thermal conditions. Accordingly, a decrease of the distance between the pre-swirl nozzle carrier (stator) and the turbine disk (rotor) will reduce the power loss. As becomes apparent, the reduced volume of the disk pre-chamber enables the frictional losses to be decreased, resulting in lesser heating of the air volume.

As opposed to the prior art, the arrangement according to the present invention provides a smooth-walled duct which additionally contributes to the reduction of the air friction. In contrast to this, the duct according to the prior art is irregular, which increases friction.

Therefore, in a particularly favorable design, the wall of the body extends essentially in a radial plane and is essentially smooth at its side facing the turbine-disk front wall. This design provides a narrow, smooth duct through which the pre-swirled air flows from the secondary pre-swirl nozzles. This improves the cooling effect, in particular owing to the reduced frictional losses. Furthermore, the pre-swirled air is kept closely to the disk.

In a further aspect of the present invention, the secondary pre-swirl nozzles are arranged radially inward and axially close to the turbine-disk front wall. This provides for a particularly effective supply of the cooling air enabling both a large area of the disk front wall and areas located further radially inward to be cooled.

The inner seal area preferably comprises a seal carrier and a seal. This provides for a generally optimized design of the pre-swirl nozzle carrier resulting in the advantages in terms of assembly and/or manufacturing costs already described.

In a favorable embodiment of the present invention, the pre-swirl nozzles are arranged obliquely to the axial direction and/or to a radial plane. The same applies for the secondary pre-swirl nozzles.

To further reduce manufacturing costs, it can be particularly beneficial to design the pre-swirl nozzle carrier as a casting. With almost all surfaces producible by casting, mechanical re-machining can essentially be dispensed with. Casting is also appropriate for producing the openings of the pre-swirl nozzles or the secondary pre-swirl nozzles, respectively.

Owing to the optimized thermal conditions, the one-piece design of the pre-swirl nozzle carrier is also beneficial in terms of stress conditons of the entire component. This benefit increases life and reduces the failure risk. By appropriate selection of materials and wall thicknesses, the respective coefficients of expansion can be optimally adapted to the requirements. With the inner seal carrier being one part with the body and, therefore, being centered via the fitting seat as well, improved centering of the inner labyrinth seal and minimized leakage are achieved.

Since the pre-swirl nozzle carrier according to the present invention is located on the main carrier by means of a fitted seat, no additional effort will arise in the case of design changes being made to the main carrier. This is also an essential advantage of the design according to the present invention.

Summarizing, the application of the pre-swirl nozzle carrier according to the present invention provides for a cost reduction by approximately 50 percent over the designs known in the prior art. In addition, it provides for a weight saving of approximately 250 grams.

BRIEF DESCRIPTION OF THE DRAWINGS

Further aspects and advantages of the present invention are described more fully in the light of an embodiment shown on the accompanying drawings, in which.

DETAILED DESCRIPTION OF THE INVENTION

Figure 1:
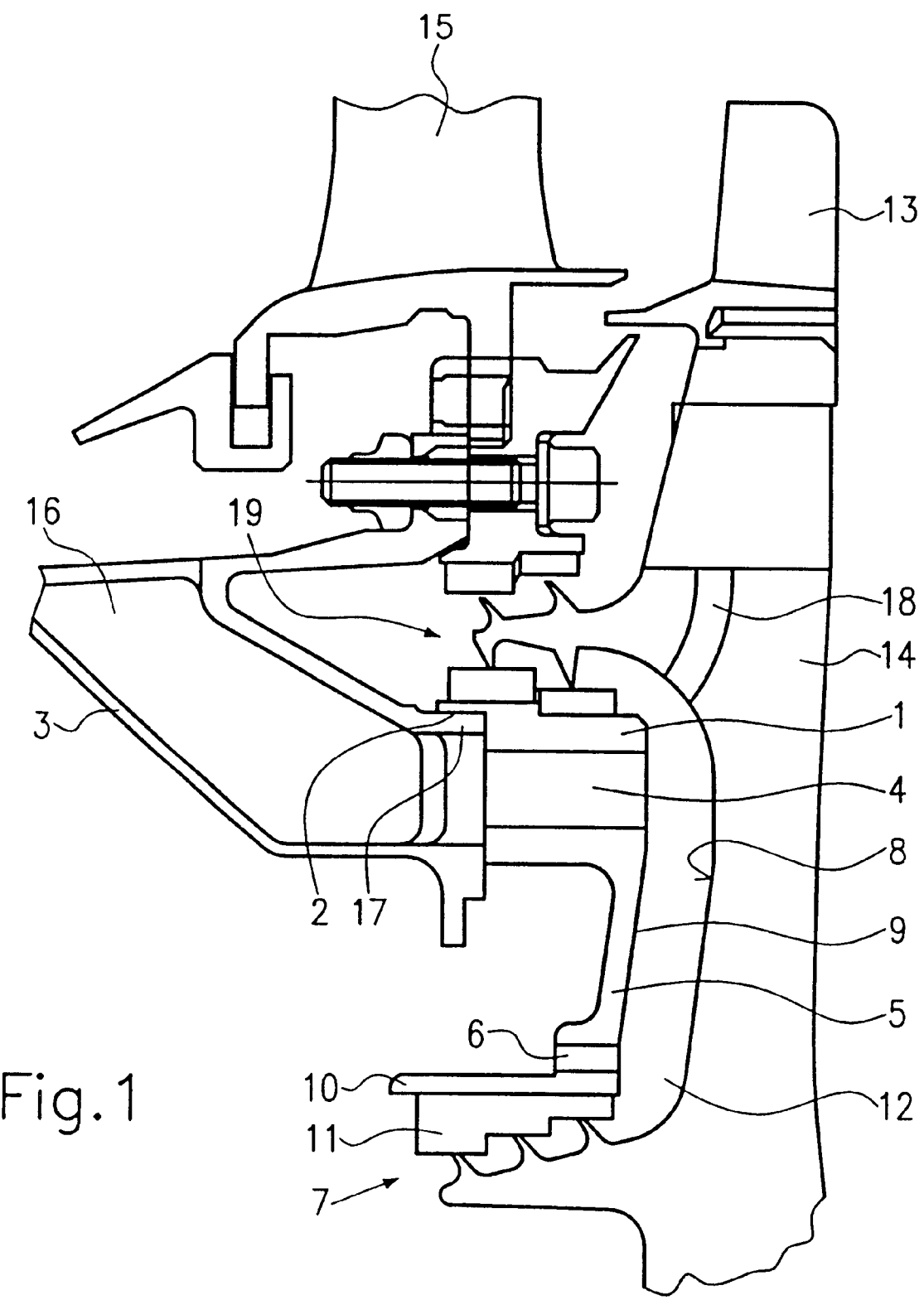
FIG. 1 is a partial sectional view of a main carrier and a turbine disk with turbine blade and a sectional view of an embodiment of the pre-swirl nozzle carrier according to the present invention.

FIG. 1 illustrates in schematic representation an axial section of a partial area of a main carrier 3 which features an air-supply duct 16. The main carrier 3 has a locating area 17 which features a fitted seat 2 for the location of the essentially circular body 1. Further design details of the main carrier 3 are dispensed with here since they are known from the state of the art. This applies particularly to the respective sealing arrangements and the vane 15.

FIG. 1 further shows a partial section of a turbine disk 14 which is rotatable about a horizontal rotational axis extending in the bottom portion of FIG. 1, this rotational axis not being shown. The turbine disk 14 carries the numerous turbine blades 13. By means of air ducts 18, cooling air, which is fed via the air-supply ducts 16 and the pre-swirl nozzles 4 to be discussed in detail below, is supplied to the turbine blades 13.

According to the present invention, the body 1 of the pre-swirl nozzle carrier is located on the main carrier 3 by means of the fitted seat 2. The radial outward sealing of the body 1 is accomplished by an outer sealing arrangement 19. Since this arrangement is also known in the prior art, a detailed description can be dispensed with herein.

The body 1 and the turbine disk 14 form a narrow, channel-type disk pre-chamber 12. It is confined by the wall 9 of the body 1, this wall 9 extending essentially in the radial direction and being essentially smooth, and by the turbine-disk front wall 8. As already explained, the volume of the disk pre-chamber 12 according to the present invention is very small.

The pre-swirl nozzles 4 are arranged obliquely to optimize the supply of cooling air to the air ducts 18.

Figure 3:
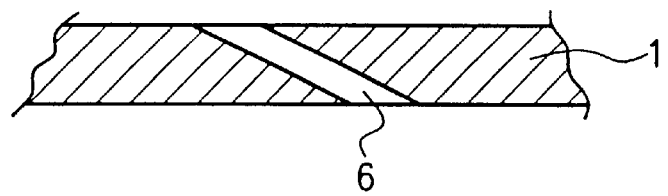
FIG. 3 is a simplified sectional view of the pre-swirl nozzle carrier according to the present invention in the area of a secondary pre-swirl nozzle.

The body 1 features a wall-type radial inner area 5 with a plurality of secondary pre-swirl nozzles 6. As illustrated in FIG. 3, the secondary pre-swirl nozzles 6 are also arranged obliquely.

Figure 4:
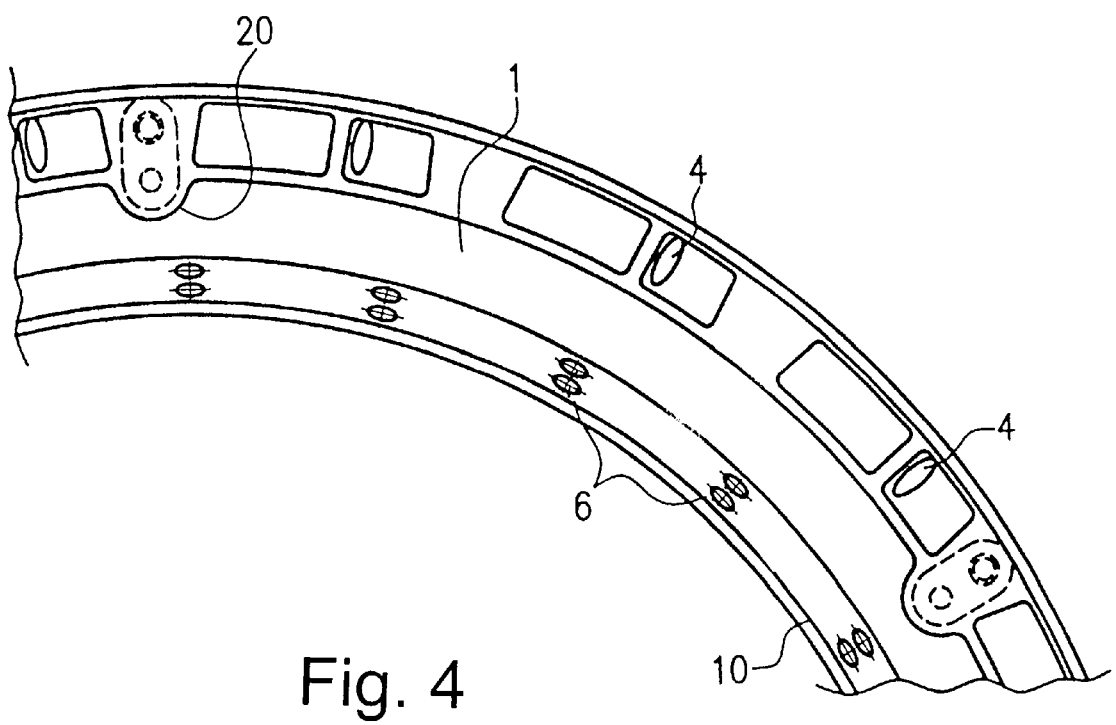
FIG. 4 is a view as in FIG. 2 showing a plurality of rows of secondary pre-swirl nozzles.

The secondary pre-swirl nozzles can be positioned in a plurality of rows on the radially inwardly extending body portion. See FIG. 4.

On the radial inner area of the body 1, a sealing portion or area 7 is provided which comprises a seal carrier 10 and a seal 11. Since the seal 11 is also known in the prior art, a description of the design details can be dispensed with herein.

Figure 2:
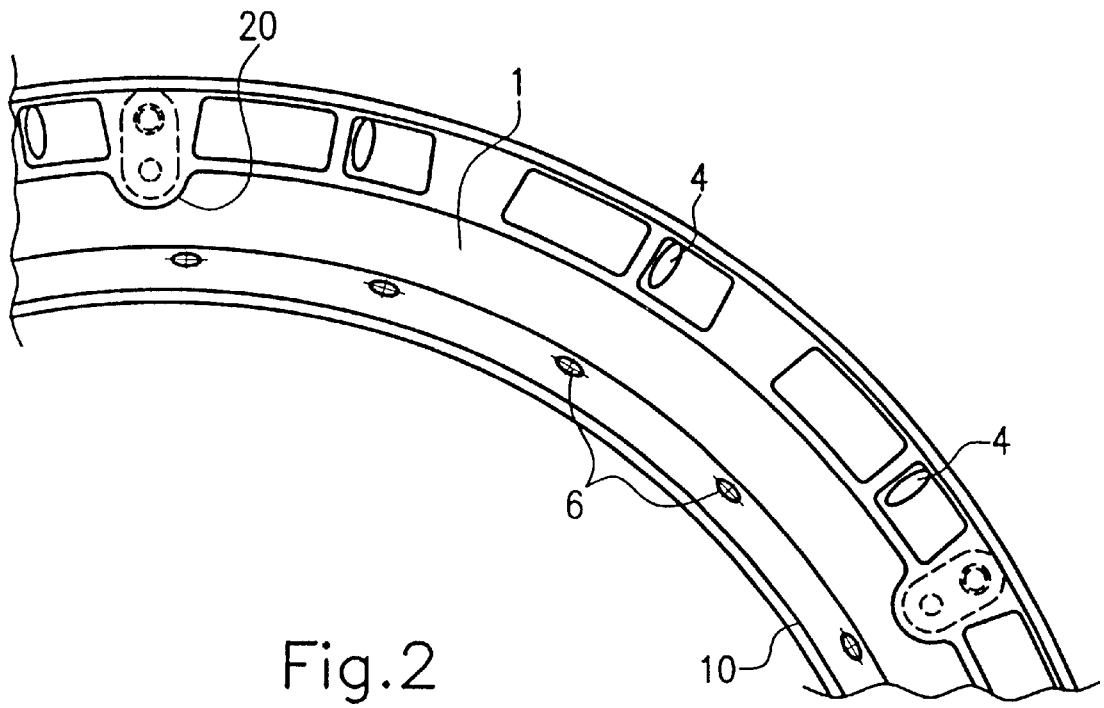
FIG. 2 is a partial side view of the pre-swirl nozzle carrier.

FIG. 2 shows a partial side view of the pre-swirl nozzle carrier according to the present invention. In front of the pre-swirl nozzles 4 and the secondary pre-swirl nozzles 6, pads 20 are provided for bolts and/or threads for the attachment of the pre-swirl nozzle carrier.

Apparently, a plurality of modifications other than those described may be made to the embodiments here shown without departing from the inventive concept.

Accordingly, the present invention also provides for setting both the primary pre-swirl nozzles and the secondary pre-swirl nozzles in several directions or planes. In the prior art, the pre-swirl nozzles are set in one direction and/or plane only. This feature of the present invention provides for improved cooling of the disk areas located farther inward.

Summarizing, then, this invention relates to a pre-swirl nozzle carrier for an aircraft gas turbine with a body 1 which is provided with a fitted seat 2 for the location of the pre-swirl nozzle carrier on a main carrier 3 and which features several pre-swirl nozzles 4, characterized in that the body 1 is extended radially inward, that it has several secondary pre-swirl nozzles 6 on its radial inward area 5 and that it is provided with a seal area 7 on its inner radial side.

What is claimed is:

1. A pre-swirl nozzle carrier for a gas turbine, comprising:
   a body comprising a wall facing axially rearward toward a turbine disk front wall such that a disk pre-chamber is formed between the body wall and the turbine disk front wall and has a narrow smooth-walled configuration;

a fitted seat positioned on the body, the fitted seat constructed and arranged to position the pre-swirl nozzle carrier on a main carrier of the gas turbine;

a plurality of pre-swirl nozzles positioned on the body communicating with the disk pre-chamber;

a body portion extending radially inwardly from the fitted seat to a radially inward side;

a plurality of secondary pre-swirl nozzles positioned on the radially inwardly extending body portion and communicating with the disk pre-chamber; and a sealing portion positioned on the radially inward side of the body.

2. The pre-swirl nozzle carrier of claim 1, wherein the body wall extends generally in a radial plane.

3. The pre-swirl nozzle carrier of claim 2, wherein a side of the body wall facing the turbine disk front wall is generally smooth.

4. The pre-swirl nozzle carrier of claim 3, wherein the secondary pre-swirl nozzles are positioned radially inward and axially close to the turbine disk front wall.

5. The pre-swirl nozzle carrier of claim 4, wherein the sealing portion comprises both a seal carrier and a seal.

6. The pre-swirl nozzle carrier of claim 5, wherein the pre-swirl nozzles are oblique to at least one of an axial direction and a radial plane.

7. The pre-swirl nozzle carrier of claim 6, wherein the secondary pre-swirl nozzles are oblique to at least one of an axial direction and a radial plane.

8. The pre-swirl nozzle carrier of claim 7, wherein the pre-swirl nozzle carrier is formed as a casting.

9. The pre-swirl nozzle carrier of claim 8, wherein the pre-swirl nozzles are formed as cast openings in the pre-swirl nozzle carrier.

10. The pre-swirl nozzle carrier of claim 9, wherein the secondary pre-swirl nozzles are formed as cast openings in the pre-swirl nozzle carrier.

11. The pre-swirl nozzle carrier of claim 10, wherein the seal carrier is centered with respect to the main carrier by the fitted seat.

12. The pre-swirl nozzle carrier of claim 11, wherein the secondary pre-swirl nozzles are positioned in a plurality of rows on the radially inwardly extending body portion.

13. The pre-swirl nozzle carrier of claim 1, wherein the secondary pre-swirl nozzles are positioned radially inward and axially close to a turbine disk front wall.

14. The pre-swirl nozzle carrier of claim 1, wherein the sealing portion comprises both a seal carrier and a seal.

15. The pre-swirl nozzle carrier of claim 14, wherein the seal carrier is centered with respect to the main carrier by the fitted seat.

16. The pre-swirl nozzle carrier of claim 1, wherein the pre-swirl nozzles are oblique to at least one of an axial direction and a radial plane.

17. The pre-swirl nozzle carrier of claim 1, wherein the secondary pre-swirl nozzles are oblique to at least one of an axial direction and a radial plane.

18. The pre-swirl nozzle carrier of claim 1, wherein the pre-swirl nozzle carrier is formed as a casting and the pre-swirl nozzles are formed as cast openings in the pre-swirl nozzle carrier.

19. The pre-swirl nozzle carrier of claim 1, wherein the pre-swirl nozzle carrier is formed as a casting and the secondary pre-swirl nozzles are formed as cast openings in the pre-swirl nozzle carrier.

20. The pre-swirl nozzle carrier of claim 1, wherein the secondary pre-swirl nozzles are positioned in a plurality of rows on the radially inwardly extending body portion.

\* \* \* \* \*